United States Patent
De Antonio et al.

(10) Patent No.: US 7,392,748 B2
(45) Date of Patent: Jul. 1, 2008

(54) FLOOR FOR AN INTERCOMMUNICATION BELLOWS BETWEEN TWO CARS

(75) Inventors: Richard De Antonio, Sainte Genevieve des Bois (FR); Bruno Dalle Molle, Sevran (FR)

(73) Assignee: Hutchinson (FR)

( * ) Notice: Subject to any disclaimer, the term of this patent is extended or adjusted under 35 U.S.C. 154(b) by 74 days.

(21) Appl. No.: 11/063,898

(22) Filed: Feb. 23, 2005

(65) Prior Publication Data

US 2005/0183621 A1  Aug. 25, 2005

(30) Foreign Application Priority Data

Feb. 25, 2004 (FR) .................................. 04 01884

(51) Int. Cl.
*B60D 5/00* (2006.01)
(52) U.S. Cl. ........................................ 105/8.1
(58) Field of Classification Search ................. 105/8.1, 105/15, 16, 17, 18, 19; 280/403
See application file for complete search history.

(56) References Cited

U.S. PATENT DOCUMENTS

| | | | | |
|---|---|---|---|---|
| 4,905,607 A | * | 3/1990 | Wanneroy | 105/8.1 |
| 6,009,813 A | * | 1/2000 | Britzke | 105/8.1 |
| 6,401,626 B1 | * | 6/2002 | Goebels et al. | 105/18 |

FOREIGN PATENT DOCUMENTS

| | | |
|---|---|---|
| DE | 33 05 062 A | 8/1984 |
| EP | 0 860 305 A | 8/1998 |
| FR | 2 764 856 A | 12/1998 |

* cited by examiner

*Primary Examiner*—S. Joseph Morano
*Assistant Examiner*—Robert J. McCarry, Jr.
(74) *Attorney, Agent, or Firm*—Alston & Bird LLP

(57) ABSTRACT

The invention relates to a flexible floor for an intercommunication bellows between two cars which, while they are traveling in a straight line, move in a longitudinal direction, said floor presenting transverse undulations enabling it to follow the relative displacements of said cars as they are going around bends, while also enabling passengers to go between the cars by walking on the top face of the floor, said transverse undulations being reinforced by metal blades extending in a transverse direction of the floor, and said floor being provided with an elastomer reinforcement interposed between the blades of each pair of said metal blades. In the floor, said elastomer reinforcements are of substantially the same transverse dimension $2L_0$, and each of them is constituted by at least one elastomer block, and, for at least one pair of metal blades adjacent to a longitudinal end of the floor, the elastomer reinforcement interposed between said metal blades is made up of at least two blocks which are spaced apart from the longitudinal plane symmetry of the floor, which plane is parallel to said longitudinal direction.

7 Claims, 5 Drawing Sheets

FLOOR FOR AN INTERCOMMUNICATION BELLOWS BETWEEN TWO CARS

The present invention relates to a flexible floor designed for an intercommunication corridor or gangway bellows between two cars, and more particularly designed for rail vehicles such as subway trains, trams, etc., or for articulated vehicles such as buses.

BACKGROUND OF THE INVENTION

Such a floor is known, for example, from European Patent EP 860 305 filed by Hutchinson on Feb. 16, 1998.

Such a floor has transverse undulations which are reinforced by metal blades, and, in addition, the bottom portion of the floor is itself reinforced by interposing elastomer reinforcements which are disposed between the metal reinforcing blades in the central portion of the floor that constitutes a gangway zone. On the top face of the floor, or of the mat covering the floor, said gangway zone is plane and marked with tread in relief.

Each gap between the blades thus receives a reinforcement of width that is at a minimum in the middle of the floor, and that increases progressively going towards the longitudinal edges of the floor that are secured to the bodies of respective cars once the support has been assembled.

Such known reinforcements essentially suffer from the drawback of not making it possible to optimize the distribution of the displacements while the cars are moving in configurations corresponding to a tight bend followed by a bend back the other way, in which configurations the longitudinal axes of the cars remain parallel, but are offset transversely, with a fan-type deployment through a total pivot angle $\alpha_M$.

OBJECTS AND SUMMARY OF THE INVENTION

An object of the invention is to provide a floor for an intercommunication bellows that makes it possible to remedy that drawback, at least in part.

The invention thus provides a flexible floor for an intercommunication bellows between two cars which, while they are traveling in a straight line, move in a longitudinal direction, said floor presenting transverse undulations enabling it to follow the relative displacements of said cars as they are going around bends, while also enabling passengers to go between the cars by walking on the top face of the floor, said transverse undulations being reinforced by metal blades extending in a transverse direction of the floor, and said floor being provided with an elastomer reinforcement interposed between the consecutive blades of each pair of said metal blades, wherein said elastomer reinforcements are of substantially the same transverse dimension $2L_0$, and each of them is constituted by at least one elastomer block, and in that, for at least one pair of metal blades adjacent to a longitudinal end of the floor, the elastomer reinforcement interposed between said metal blades is made up of at least two blocks which are spaced apart from the longitudinal plane symmetry (XX') of the floor, which plane is parallel to said longitudinal direction.

At least for said pair of metal blades, the number of blocks that make up an elastomer reinforcement interposed between the blades of said pair is two, each of said blocks has the same transverse dimension ($L_0$), and they are disposed symmetrically about said plane of symmetry.

Advantageously, on either side of the transverse midplane of the floor, said floor has n elastomer reinforcements, each of those reinforcements of rank i lying in the range n-p to n being made up of at least two elastomer blocks, the rank 1 designating the elastomer reinforcements adjacent to the transverse midplane and the rank n designating the elastomer reinforcements adjacent to the longitudinal ends of the floor, said elastomer reinforcements of rank i lying in the range n-p to n being made up of elastomer blocks for which distance d from said plane of symmetry (XX') of the floor is an increasing function of rank i.

The elastomer reinforcements may be interposed between metal elements, each of which is secured to a respective one of said metal blades of the floor. The metal elements and said elastomer reinforcements thus form at least one removable structure.

BRIEF DESCRIPTION OF THE DRAWINGS

Other characteristics and advantages of the invention will appear more clearly on reading the following description which is given by way of non-limiting example and with reference to the accompanying drawings, in which.

MORE DETAILED DESCRIPTION

Figure 1:
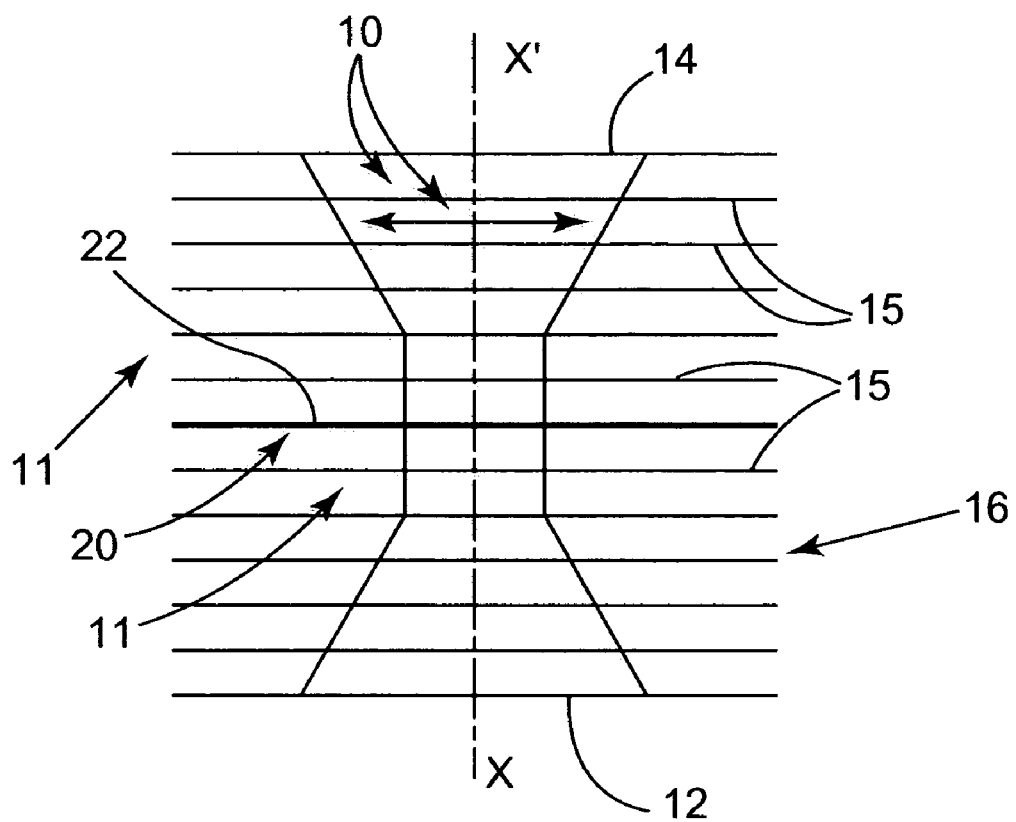
FIG. 1 is a diagrammatic view from below, showing a prior art elastomer reinforcement structure.

As shown in FIG. 1, a floor that is known, for example, from European Patent EP 860 305 is constituted by a solid piece of elastomer which is obtained by molding and which presents transverse undulations 16 provided with reinforcements constituted by metal blades 15. The undulations 16 are interrupted in a central region of the floor by solid elastomer reinforcements 10 of width L that is at its minimum in a middle region 11 and that increases progressively going towards the longitudinal ends 12 and 14 that are secured to the bodies of cars.

When there are two half floors, a central ring 22 exists in the midplane 20, and one end of each the two half-floors is secured to the end of the body of a respective car. They are identical and mounted head-to-tail, their other ends being secured to the central ring 22.

Figure 2:
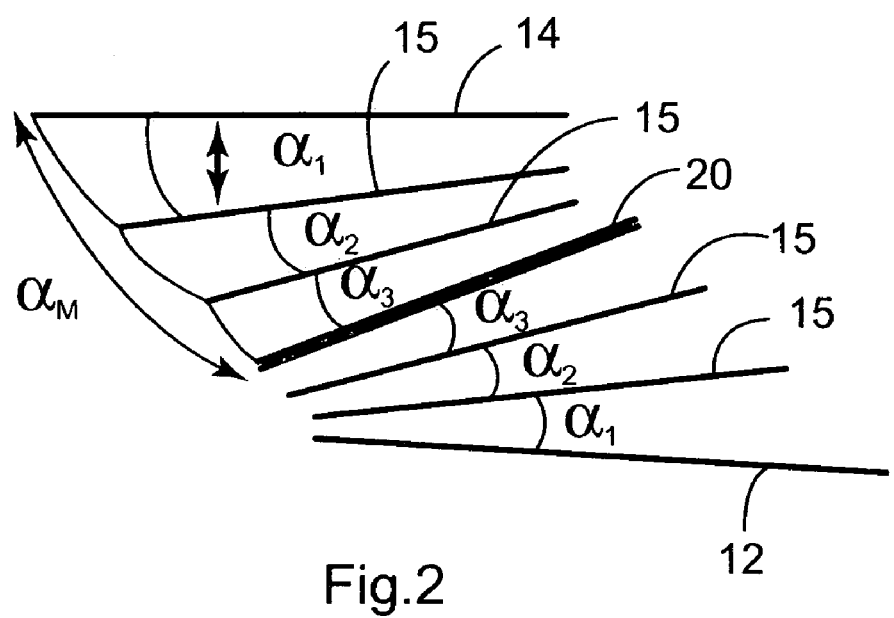
FIG. 2 shows the angular displacements in the above-mentioned configuration (tight bend followed by a bend back the other way)

As shown in FIG. 2, in a configuration including a tight bend followed by a bend back the other way, the body edges of the two cars, and therefore the longitudinal ends 12 and 14 of the floor that are secured thereto are substantially parallel but offset laterally, and fan-type deformation takes place, through a total angle $\alpha_M$ that can be explained as follows.

The reinforcement structure for reinforcing the floor is a laminated structure that associates elastically-deformable portions of elastomer (the elastomer reinforcements) and the metal reinforcing blades 15.

The lateral offset between the ends 12 and 14 generates shear action in the horizontal plane, the effect of which action is made up of:

a translation component urging the metal blades 15 to move in translation in the transverse direction, parallel to the ends 12 and 14; and a pivot component urging the metal blades 15 to pivot relative to one other through angles $\alpha_1, \alpha_2, \alpha_3, \ldots,$ symmetrically about the midplane 20.

The pivot force on the blades 15 is larger at the ends 12 and 14 and almost zero on the midplane 20 which constitutes a transverse axis of symmetry for the floor.

The prior art floor (FIG. 1) suffers from the drawback that the amplitude of the transverse movement in translation is not the same for all of the blades. It is larger in the middle region 11, thereby inducing high shear levels in said region that reduce the life of the floor.

Figure 3A:
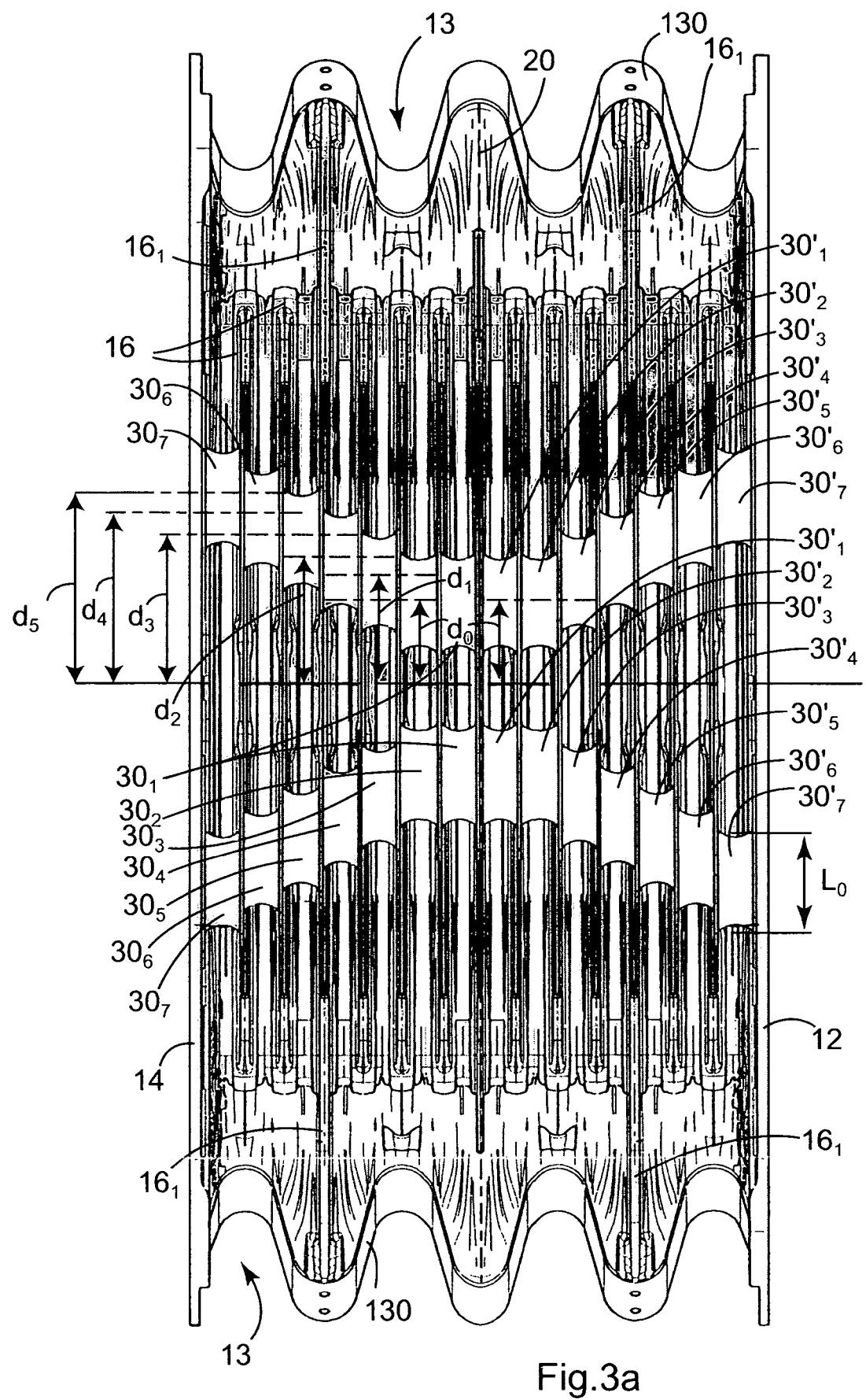
FIGS. 3a and 3b are views from below showing two embodiments of a floor having an elastomer reinforcement structure of the invention.

In known manner, the floor shown in FIG. 3a presents raised edges 13 provided with undulations 130, the pitch of which is, for example a multiple of the pitch of the undulations 16. The raised edges are secured to respective bellows regions (not shown) which close the periphery of the corridor connection. It can also be observed that certain undulations 16$_1$ whose troughs face troughs of undulations 130 are extended transversely outwards to reach them.

Figure 3B:
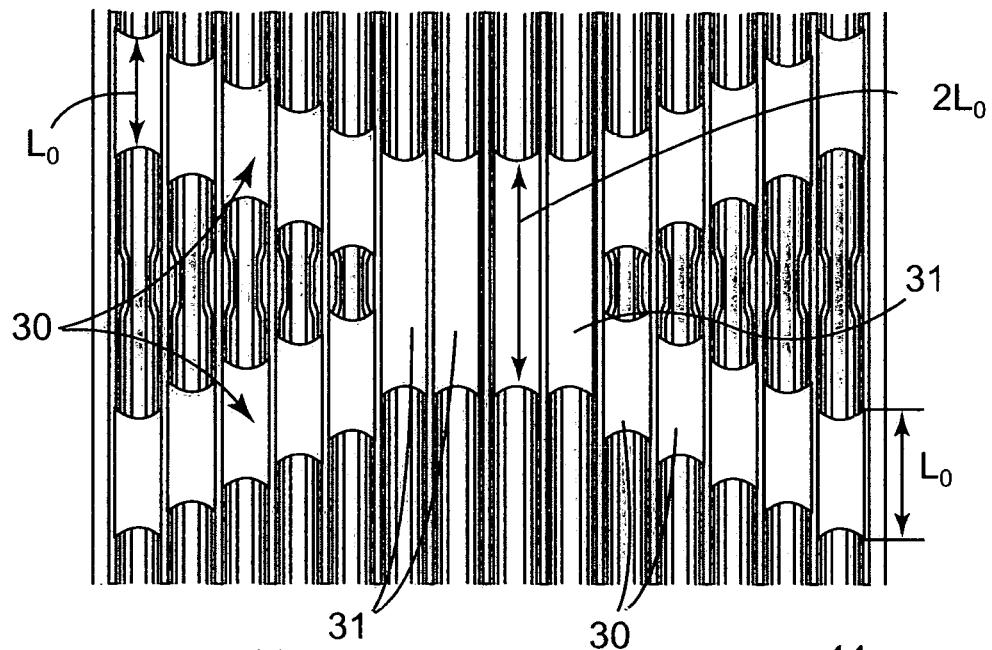

In the invention, and as shown in FIG. 3a, the reinforcements are not continuous, but rather each of them is separated into at least two reinforcement blocks of elastomer 30 of identical length $L_0$ that are disposed symmetrically about the longitudinal axis XX' of the floor (which axis is defined as being the direction in which the cars travel when going straight ahead). Alternatively, certain blocks can meet in the middle portion in order to form a single reinforcement 31 of length $2L_0$ (see FIG. 3b).

As from a significant distance away from the midplane 20, where the pivot stresses are small, the elastomer reinforcement elements 30 are spaced apart from the longitudinal axis XX' to increasing extents going towards the longitudinal ends 12 and 14, where the pivot stresses are the largest, hence the resulting substantially X-shaped configuration.

In the example of FIG. 3a, the two pairs of blocks of rank 1 30$_1$ and 30'$_1$ that are adjacent to the midplane 20 and the two pairs of blocks of rank 2 30$_2$ and 30'$_2$ are spaced apart from the axis XX' by a distance $d_0$ and the pairs of blocks of the next ranks 30$_3$, 30'$_3$, ..., 30$_7$ and 30'$_7$ are spaced apart from the axis XX' by respective distances $d_1, d_2, d_3, d_4, d_5$ that are greater than $d_0$ and that increase progressively with increasing rank.

By means of the fact that the total width of the reinforcements is always equal to $2L_0$, a uniform distribution of the amplitude of movement in translation of the blades is thus obtained because, as the inventors have shown, the translation component is the same for all of the metal blades 15.

By means of the fact that the reinforcement blocks 30 of width $L_0$ are spaced progressively and symmetrically further apart from the plane of longitudinal symmetry of the floor, which plane contains the longitudinal axis XX', a more uniform distribution is obtained for the pivot angles $\alpha_1, \alpha_2, \alpha_3, \ldots,$ of the metal blades 15, since the progressively increasing spacing $(d_1, d_2, d_3, d_4, d_5)$ enables the pairs of reinforcement blocks to generate progressively increasing torque acting against the pivot components, which increase going towards the edges of the bodies of the cars. The better distribution of said pivot angles makes it possible to increase the life of the floor and of the reinforcement elements.

It is thus possible to determine the spacing relationship so that the pivot angles $\alpha_1, \alpha_2, \alpha_3, \ldots$ are substantially equal.

A linear relationship corresponding to the example shown (X-shape with straight branches) can be suitable to a first approximation.

The preferred embodiment of FIGS. 4a to 4d implements a reinforcement structure that is removable, which offers several advantages:

since the reinforcement elements are part of a separate structure, it is no longer necessary to interrupt the undulations 16 which can continue uninterrupted; this increases the life of the floor because it is thus possible to avoid the connections between the undulations 16 and the reinforcement blocks, which connections are a source of concentration of stresses;

since the undulations 16 are no longer interrupted by the elastomer reinforcement elements, it is possible to space them apart from the longitudinal axis by a distance that is larger, thereby facilitating optimizing the pivot angles;

the reinforcement structure can be replaced without replacing the floor; and the floor is simpler to manufacture, and in particular the mold is much simpler.

Figure 4B:
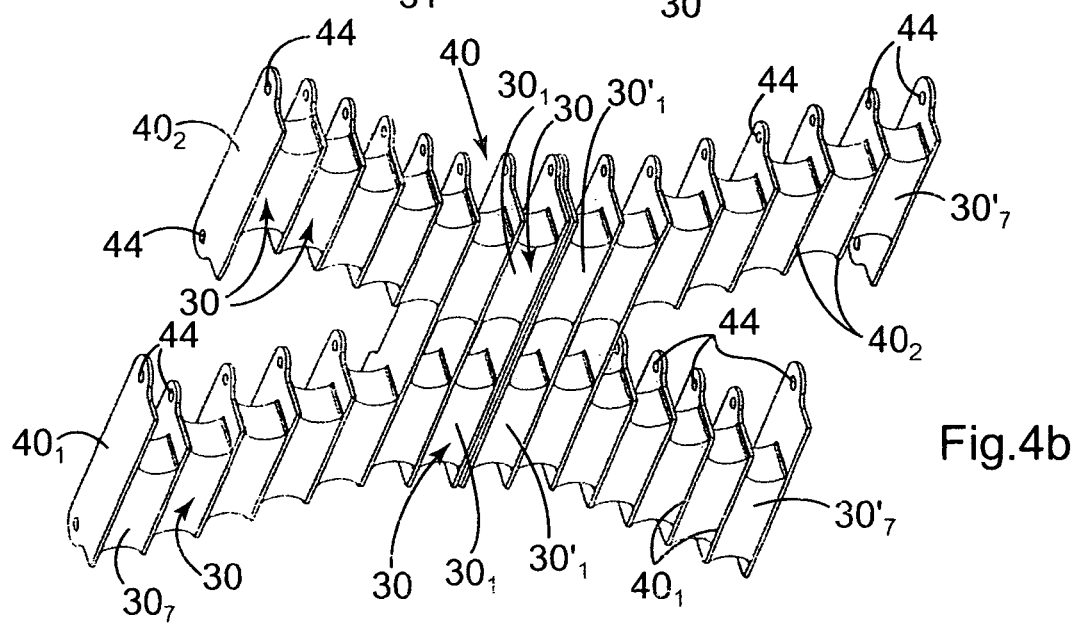
FIGS. 4a to 4d show a preferred embodiment of the invention, in which the reinforcement structure is removable, FIGS. 4a to 4c being perspective views from below showing the floor on its own (FIG. 4a), the reinforcement structure (FIG. 4b) on its own, and the floor and reinforcement structure assembled together (FIG. 4c), FIG. 4d being an end-on view of the floor and reinforcement structure as assembled together.
Figure 4D:
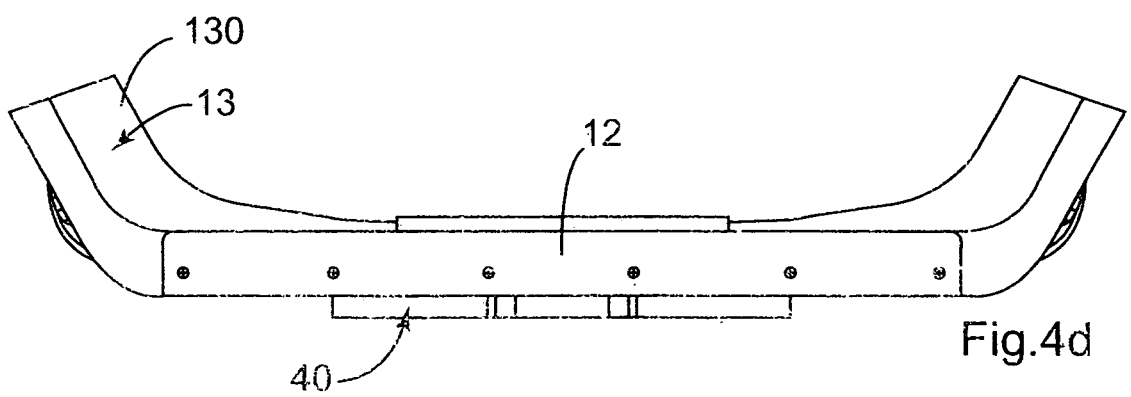
Figure 4A:
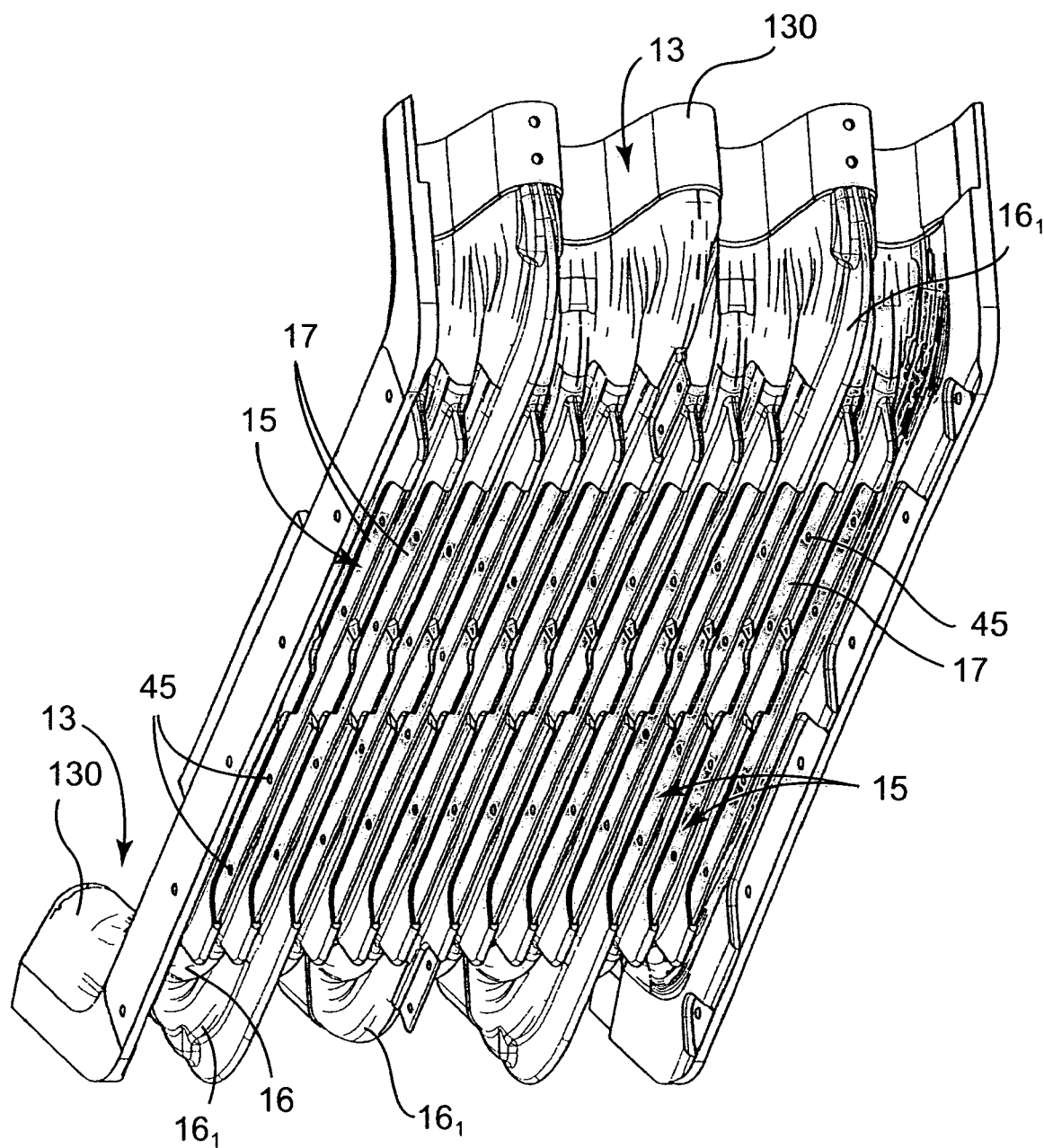

As shown more particularly in FIG. 4b, the removable reinforcement structure or "beam" presents metal elements, in particular metal blades 40 between which the reinforcement blocks 30 of length $L_0$ are interposed. Said metal blades 40 can be in two portions 40$_1$ and 40$_2$ in alignment. They can be continuous, like some of the blades 40 shown in the middle portion.

Figure 4C:
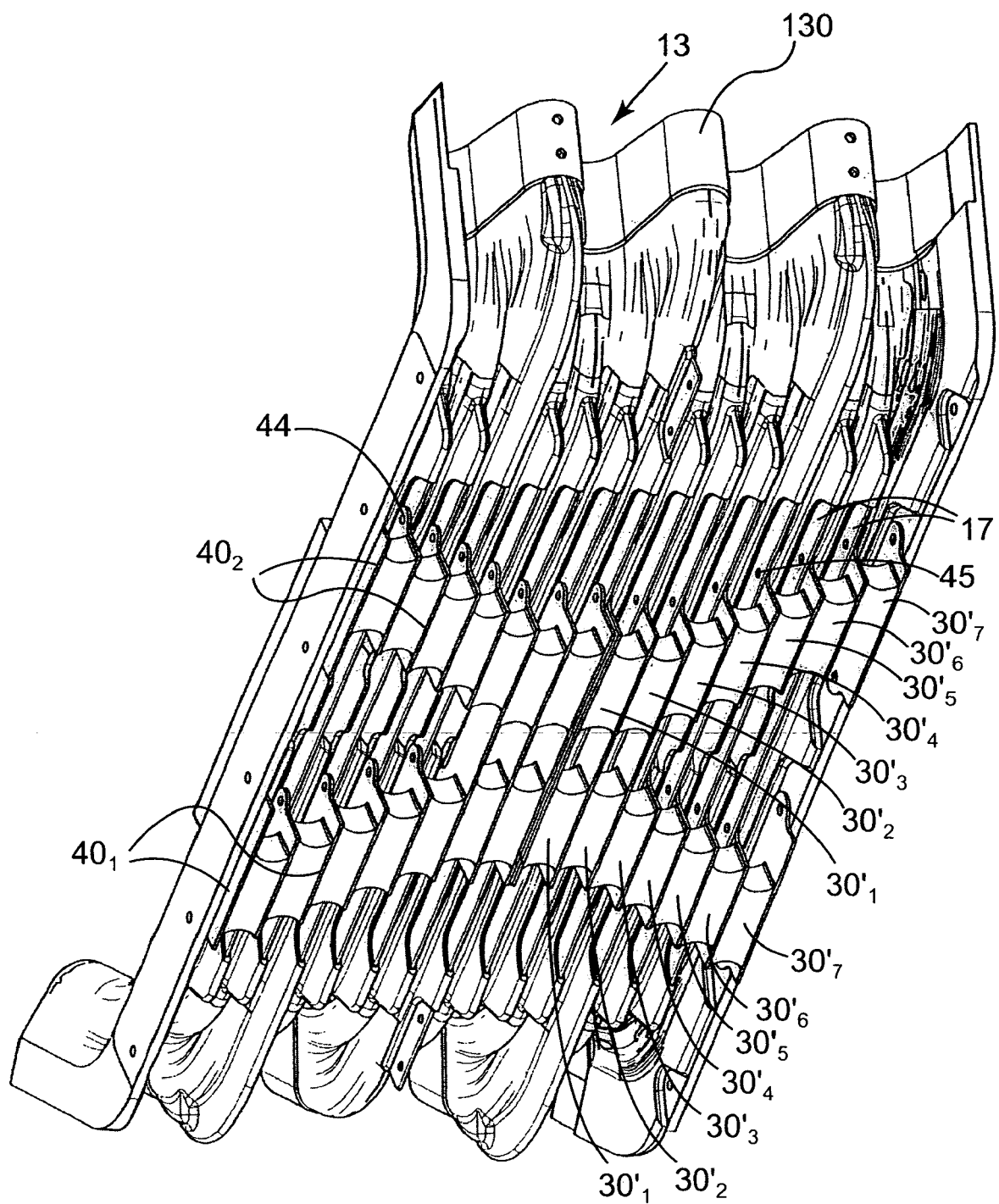

Each of the metal blades 40 is fastened to a metal blade 15 of the floor as shown in FIG. 4c. This fastening is achieved in general by nuts and bolts through corresponding holes 44 and 45 in the metal blades 40 and 15. For this purpose, each of the metal blades 15 presents a bottom region 17 that projects from the elastomer mass which constitutes the floor, and in which the remainder of the blade 15 is embedded.

What is claimed is:

1. A flexible floor for an intercommunication bellows between two cars, said floor having a longitudinal axis and being provided at its longitudinal ends with a securing device adapted to connect it to the end of the body of a car and said floor being provided with transverse undulations disposed in a transverse direction that is perpendicular to the longitudinal axis and with a walking top face, said transverse undulations being reinforced by metal blades extending in said transverse direction of the floor, and said floor also comprising an elastomer reinforcement interposed between the said metal blades, wherein said elastomer reinforcements each have substantially the same transverse dimension $2L_0$, along the transverse direction and each elastomer reinforcement is constituted by at least one elastomer block, and wherein, at least the two elastomer reinforcements adjacent to each longitudinal end of the floor are made up of at least two blocks which are spaced apart from a longitudinal plane of symmetry of the floor, which plane of symmetry is parallel to said longitudinal direction.

2. A floor according to claim 1, wherein, at least for said pair of metal blades, the number of blocks that make up an elastomer reinforcement interposed between the blades of said pair is two, and each of said two blocks has the same transverse dimension, and wherein they are disposed symmetrically about said longitudinal plane of symmetry.

3. A floor according to claim 1, wherein, on either side of a transverse midplane of the floor, said floor has n elastomer reinforcements, each of those reinforcements-being made up of at least two elastomer blocks, the elastomer reinforcements being sequentially ranked by integers ranging from 1 to n, with rank 1 designating the elastomer reinforcements adjacent to the transverse midplane and rank n designating the elastomer reinforcements adjacent to the longitudinal ends of the floor, said elastomer reinforcements-being made up of elastomer blocks having a distance d from said longitudinal plane of symmetry of the floor which is an increasing function of rank.

4. A floor according to claim 3, wherein said increasing function is linear.

5. A floor according to claim 3, wherein each of the elastomer reinforcements is made up of one continuous block.

6. A floor according to claim 3, wherein n=7.

7. A floor according to claim 1, wherein said elastomer reinforcements are interposed between metal elements, each of which is secured to a respective one of said metal blades of the floor, said metal elements and said elastomer reinforcements forming at least one removable structure.

* * * * *